(12) United States Patent
Sotoudeh et al.

(10) Patent No.: US 8,585,964 B2
(45) Date of Patent: Nov. 19, 2013

(54) COMPOSITION AND METHOD FOR REDUCING WHITE RUST CORROSION IN INDUSTRIAL WATER SYSTEMS

(75) Inventors: Kaveh Sotoudeh, Naperville, IL (US); Sherman J. Sprague, Twinsburg, OH (US); Frank Fun-Yuee Lu, Naperville, IL (US); Tom Kim, Naperville, IL (US)

(73) Assignee: Nalco Company, Naperville, IL (US)

( * ) Notice: Subject to any disclaimer, the term of this patent is extended or adjusted under 35 U.S.C. 154(b) by 281 days.

(21) Appl. No.: 12/352,768

(22) Filed: Jan. 13, 2009

(65) Prior Publication Data

US 2010/0178197 A1   Jul. 15, 2010

(51) Int. Cl.
*C23F 11/00* (2006.01)

(52) U.S. Cl.
USPC ............. 422/16; 252/387; 252/388; 252/390; 252/394

(58) Field of Classification Search
USPC .................... 422/16; 252/387, 388, 390, 394
See application file for complete search history.

(56) References Cited

U.S. PATENT DOCUMENTS

| | | | |
|---|---|---|---|
| 4,101,328 A | 7/1978 | Fieser et al. | |
| 4,719,083 A | 1/1988 | Baker et al. | |
| 4,806,310 A * | 2/1989 | Mullins et al. | 422/13 |
| 5,217,686 A | 6/1993 | Vanderpool et al. | |
| 5,219,523 A | 6/1993 | Vanderpool et al. | |
| 5,236,626 A | 8/1993 | Vanderpool et al. | |
| 5,407,597 A | 4/1995 | Busch et al. | |
| 5,746,947 A | 5/1998 | Vanderpool et al. | |
| 6,183,649 B1 | 2/2001 | Fontana | |
| 6,468,470 B1 | 10/2002 | Oldsberg et al. | |
| 6,966,213 B2 | 11/2005 | Hoots et al. | |
| 7,169,236 B2 | 1/2007 | Zeiher et al. | |
| 7,252,096 B2 | 8/2007 | Gill et al. | |
| 2008/0145549 A1 * | 6/2008 | Kidambi | 427/402 |
| 2008/0264870 A1 | 10/2008 | Duke et al. | |

* cited by examiner

*Primary Examiner* — Monique Cole

(74) *Attorney, Agent, or Firm* — Edward O. Yonter; Andrew D. Sorensen

(57) ABSTRACT

This invention provides a novel, synergistic composition and method for reducing corrosion, particularly white rust corrosion, on galvanized metal surfaces in industrial water systems. The composition is a synergistic blend and preferably comprises from about 0 to about 10 weight percent of an amine-based white rust corrosion reducer and from about 10 to about 90 weight percent of a benzotriazole. In a method for using the synergistic blend, an effective amount of the blend is introduced onto the galvanized metal surface to form a barrier on the surface. After one or more time intervals, the composition is optionally overlayed onto the initial barrier by reintroducing an effective amount of the composition onto the galvanized metal surface.

12 Claims, 1 Drawing Sheet

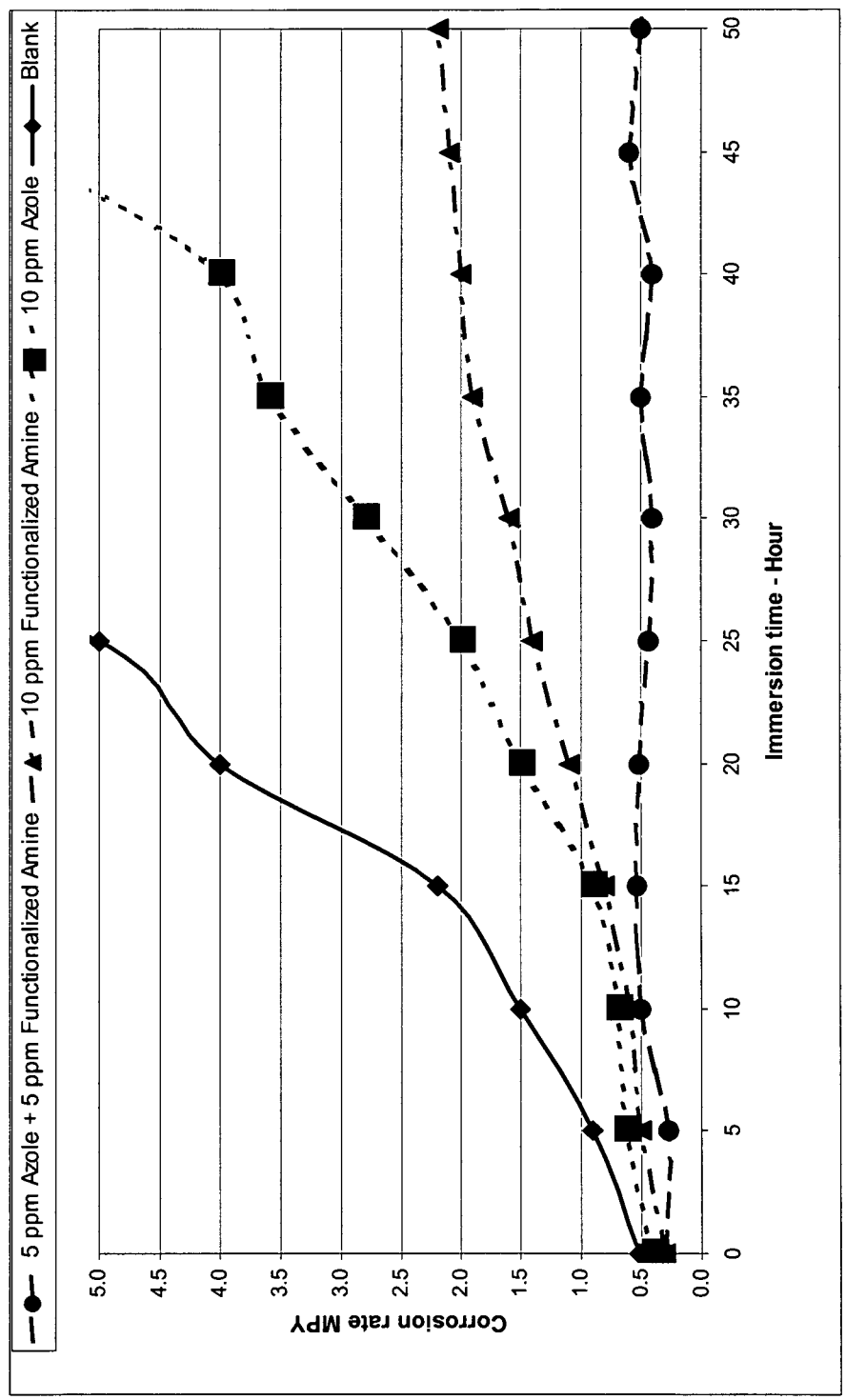

COMPOSITION AND METHOD FOR REDUCING WHITE RUST CORROSION IN INDUSTRIAL WATER SYSTEMS

TECHNICAL FIELD

This invention relates generally to reducing corrosion on galvanized metal surfaces in industrial water systems. More specifically, the invention relates to a method for reducing white rust corrosion on galvanized surfaces in industrial water systems. The invention has particular relevance for reducing white rust corrosion on galvanized metal surfaces in industrial water systems using synergistic blend of functionalized amine-based white rust corrosion reducing compounds and one or more benzotriazoles.

BACKGROUND

Corrosion is a leading cause of process equipment and piping failures in industrial water and process systems. Each year companies are forced to spend billions of dollars for corrosion-related equipment replacement costs and the associated production downtime. Galvanization is a protective zinc coating that is chemically bonded to a metal (usually iron or steel) surface. The galvanizing process produces a coating of zinc-iron intermettalic alloy layers on steel with a relatively pure outer layer of zinc. The zinc coating of the metal's galvanized surface performs as a sacrificial anode, which protects the steel and also forms a barrier to a continuous ongoing reaction of the steel with the environment. When galvanized steel is exposed to a neutral pH and moderately hard water environment a surface barrier of non-porous zinc carbonate/zinc hydroxide forms to prevent further rapid corrosion of the zinc coating. Because zinc is a very reactive metal, the protective "basic zinc carbonate" barrier must be formed for the HMG (hot milled galvanized) steel component to achieve full service life.

Zinc coating is used in a variety of applications and offers a certain degree of corrosion protection for the underlying metal by providing a mechanical barrier to the elements and environment as well as electrochemical resistance to corrosion. Several galvanizing methods exist, such as electroplating, continuous galvanization, hot dip, hot mill. In practice, hot dipped galvanized surfaces generally have a thickness of about 2.5 mils and hot milled galvanized surfaces have a thickness of about 4 mils. Many industrial water systems, such as cooling water circulation systems have such galvanized surfaces.

Galvanized steels typically found in refrigeration condensers or evaporative coolers can experience a type of premature corrosion, generally identified as "white rust." The term "white rust" refers to a type of corrosion product affecting galvanized surfaces characterized as an accumulation of white, fluffy, or waxy non-protective zinc corrosion product that adheres to the zinc surface of galvanized steel. With this non-protective porous reaction product in place, the surface is not passive to future zinc reaction and rapid corrosion may continue. White rust is capable of causing considerable damage to the zinc coating and is also detrimental to the appearance of the galvanized coating. If left unchecked, white rust will continually corrode affected galvanized surfaces and eventually lead to early failure of the coating.

Moreover, white rust can become very destructive if allowed to advance untreated, because once the zinc layer has been consumed, corrosion of the mild steel may progress rapidly. In particular, pH levels less than 6.0 or greater than 9.0 will increase zinc corrosion significantly. Anions of sulfates, chlorides, and nitrates at high levels (as the ion) may accelerate loss of zinc, and the amount and type of alkalinity present is also important. High concentrations of free halogens such as chlorine (or bromine) may also be corrosive to zinc galvanizing. Low hardness water, calcium hardness as $CaCO_3$ is <50 ppm in the recirculating water, may result in accelerated zinc corrosion. High levels of chemical treatments likewise are a contributing factor in the corrosion of zinc.

To ensure long service life, the galvanized surfaces in cooling towers typically must be allowed to "passivate" or form a protective barrier prior to initial operation or start-up. Proper water treatment and start-up procedures are also essential. One way to passivate the surfaces is to allow the zinc coating to develop a natural nonporous surface of basic zinc carbonate during initial start-up of the cooling tower. This natural chemical barrier helps prevent or slow further rapid corrosion of the zinc coating from the environment as well as from normal cooling tower operation.

This basic zinc carbonate barrier, believed to be a zinc carbonate/zinc hydroxide compound (as discussed in "Guidelines for Treatment of Galvanized Cooling Towers to Prevent White Rust," published by the Cooling Tower Institute in June 1994) typically forms within eight weeks of initial cooling tower operation with water of neutral pH (i.e., pH 6.5 to 8.0) and moderately hard water environment. A typical solute content range would be calcium ($CaCO_3$) content of 100 ppm to 300 ppm as bicarbonate alkalinity and about 100 ppm $CaCO_3$ hardness. Formation of the protective zinc carbonate barrier is important for the cooling tower to resist further corrosion. Barrier absence could result in severe white rust formation and have a significant negative impact on the service life of a cooling tower.

White rust is also a form of zinc carbonate that has a different porous structure, rate of formation, and density than the protective zinc carbonate barrier described above. If the water hardness levels, measured by $CaCO_3$ hardness, reach levels below 50 ppm (i.e., soft water), accelerated zinc corrosion generally results. Certain ionic content in the water, such as sulfates, chlorides, and nitrates at levels greater than about 250 ppm may also contribute to accelerated zinc corrosion. Thus, routine inspection of the cooling tower coupled with adequate control of the water chemistry aids in the prevention of white rust formation.

Current white rust corrosion prevention programs include a combination of pre-passivating the cooling tower combined with ongoing water chemistry management to support the viability of the passivation layer. In addition to the basic zinc carbonate protective layers, as described above, white rust preventatives include pretreatment with inorganic phosphate and chromate passivation. Such inorganic solutions have limited effectiveness and are steadfastly becoming the object of federal and local regulations due to environmental concerns.

Other solutions for white rust prevention include using selective thiocarbamates, organo-phosphorous compounds, and tannins to passivate the surface. For example, U.S. Pat. No. 5,407,597 provides a formulation including a mixture of an organophosphorous compound, a thiocarbamate compound, and soluble metal salt compound. The components of this formulation are used as a combination and the ingredients tested alone typically do not control white rust formation. The formulation in U.S. Pat. No. 6,468,470 B1 includes a multi-component system of an organophosphorous compound, a tannin compound, and a soluble salt of a metal.

Moreover, under normal operating conditions, cooling towers have substantial evaporative water loss. As a result, large quantities of "make-up" water are introduced into the system that commonly contains ionic species, such as calcium, magnesium, sulphate, and chloride. Increased alkalinity (e.g., carbonate, bicarbonate, and hydroxide ions) may also cause white rust corrosion. Particularly, accumulation of carbonate alkalinity, with a concomitant pH increase, creates an ideal white rust-forming environment. This accumulation is one of the major causes of white rust. The presence of excess anions and/or soft water can aggravate the degree of white rust formation by, for example, reacting with the zinc coating to produce zinc hydroxide.

As an integral component of cooling water circulation systems biocides are essential is preventing algal, bacterial, and fungal contamination of the systems. Some of these biocides sometimes promote white rust formation as a byproduct because they chemically react with certain white rust inhibitors and/or with the zinc coating. For example, sodium hypochlorite (i.e., bleach) is a common biocide and is highly reactive.

Because high pH levels are also contributing factor to white rust formation, the addition of a sufficient quantity of free acid, commonly sulfuric acid, to the cooling water helps preclude the formation of white rust. Such free acid addition creates concerns for those handling the free acid and also creates potential for metal corrosion from the acid itself due to overfeed or spillage. None of these passivation or maintenance procedures described above provides a complete solution to the white rust problem. There thus exists a need to provide efficient and improved compositions and methods of reducing white rust corrosion.

SUMMARY

This invention accordingly provides a novel, synergistic composition and method for reducing corrosion, particularly white rust corrosion, on galvanized metal surfaces in industrial water systems. In a first aspect, the invention includes a composition for reducing white rust in an industrial water system. The composition is a synergistic blend and preferably comprises from about 0 to about 10 weight percent of a first compound and from about 10 to about 90 weight percent of a second compound. The first compound is of the formula $[R]_2N-R1_x-N[R]_2$ and the second compound being at least one benzotriazole. R includes H, mono-hydroxylated alkyl groups, or poly-hydroxylated alkyl groups; R1 includes $-[CH_2CH_2-N(R2)-CH_2CH_2]$, oxypropylene, oxyethylene, polyether, or combinations thereof; R2 includes H, alkyl groups, alkylated carboxylates, alkylated sulfonates, mono-hydroxylated alkyl groups, or poly-hydroxylated alkyl groups; and X is from 1 to about 20.

In another aspect, the invention includes a method of reducing corrosion on a galvanized metal surface. The method comprises introducing an effective amount of the disclosed composition onto the galvanized metal surface to form a barrier on the surface. After one or more time intervals, the composition is optionally overlayed onto the initial barrier by reintroducing an effective amount of the composition onto the galvanized metal surface.

The invention also provides a method of reducing corrosion on a galvanized metal surface. The method includes introducing an effective amount of a corrosion-reducing composition onto the galvanized metal surface to form a barrier on the surface. The term "barrier" as used herein includes surface modification of the galvanized surface, change of morphology of the galvanized surface, chemical interaction of any of the white rust corrosion-reducing compounds with the galvanized surface, or any other similar modification of or interaction with the surface.

It is an advantage of the invention to preserve the integrity of cooling systems by extending the service life of galvanized condenser system components through improved corrosion protection.

It is another advantage of the invention to provide a synergistic corrosion-reducing blend capable of significantly reducing the rate of corrosion and decreasing the loss of galvanized metal.

An additional advantage of the invention is to provide a durable corrosion inhibitor that maintains corrosion protection through condenser starts and stops or shutdowns by efficiently reestablishing a full level of galvanic metal corrosion protection.

It is a further advantage of the invention to allow operation at higher cooling cycles or to use recycled water in condenser systems.

It is yet another advantage of the invention to provide corrosion protection over a broad pH range, especially in higher pH ranges that will allow reduction or elimination of acid feed.

Additional features and advantages are described herein, and will be apparent from, the following Detailed Description and Examples.

BRIEF DESCRIPTION OF THE DRAWINGS

FIG. 1 illustrates the synergistic effect observed as measured by electrochemical corrosion rate, as further explained below in Example 3.

DETAILED DESCRIPTION

Preparing the surface of galvanized surfaces is commonly called passivation and is an extremely important step to properly in corrosion protection, in the form of white rust and otherwise. Treatment typically begins with careful preparation of the metal surface. If the surface is not carefully prepared, the corrosion inhibitor barrier may not bond properly to the surface resulting in poor corrosion protection. In certain cases, such as if the system is highly fouled or in poor condition, a chemical or mechanical cleaning should be considered prior to implementing a passivation procedure. It is important to minimize mechanical damage to the zinc coating during system installation. Areas that are abraded or significantly damaged can be repaired with cold galvanizing paint for satisfactory protection. Before any passivation, the tower should be freed of debris by sweeping or flushing with water.

Initial passivation of galvanized surfaces to minimize corrosion is normally accomplished, for example, by pretreatment with an inorganic phosphate passivation program (requires a minimum of 100-ppm calcium as $CaCO_3$ and 400-450 ppm $PO_4$) or operating with the cooling water initially for 45 to 60 days in the pH range of 7.0 to 8.0, moderate hardness levels of 100 to 300 ppm as $CaCO_3$, and alkalinity levels of 100 to 300 ppm as $CaCO_3$. Any other suitable passivation method may be used in conjunction with the invention as deemed appropriate by a skilled artisan. In any method of passivation, it should be performed prior to new system-start up; after chemical or mechanical cleaning, system turn-arounds, and emergency or long-term system lay-ups; after system upsets such as a low pH excursion; or after any sanitation of the system.

The present invention includes a synergistic blend of passivation agents, corrosion inhibitors, and/or dispersants designed to reduce white rust corrosion by blocking galvanized surface interaction, for example, anions and alkalinity in the circulating water of the system. The term "reducing" is used herein with its broadest possible interpretation. That is, reduction of white rust corrosion may be a minimal amount (e.g., about 1 to 10 or 20 percent), a more moderate amount (e.g., from about 20 to 50 percent or more), or a near complete inhibition (e.g., greater than 50 percent and ranging up to near 100 percent). In an embodiment, the blend of the invention forms a monolayer organic barrier. In another embodiment, the blend of the invention forms a layer consisting of more than one layer.

To reduce scale and/or corrosion, the blend may act as a stand-alone treatment or as a supplement to other treatments used in open recirculating cooling systems. The synergistic blend forms an adsorbed organic molecule layer on galvanized surfaces which both passivate the surface and block the anions and cations chiefly responsible for white rust formation, while promoting the zinc carbonate layer that maintains long term protection of the surfaces against white rust.

The synergistic blend of the invention is primarily comprised of one or more benzotriazoles. Tolyltriazole is preferred. "Benzotriazoles" as used herein refers to a class of compounds having the benzotriazole skeleton. Examples of compounds suitable for use in the invention include benzotriazole; mercaptobenzothiazole; tolyltriazole; substituted benzotriazoles, such as chlorobenzotriazole, nitrobenzotriazole, butylbenzotriazole, etc. and 1-phenyl-5-mercaptotetrazole, and salts thereof and the use thereof as corrosion and/or erosion inhibitors, particularly for use in systems having copper and copper alloy components. Additional examples may be found in U.S. Pat. Nos. 5,217,686; 5,219,523; 5,236,626; and 5,746,947 (each incorporated herein by reference in its entirety). These compositions form long-lasting protective films on galvanized surfaces. Additionally, these compositions generally provide improved tolerance to oxidizing biocides that include halogens such as chlorine and bromine.

According to at least one embodiment, the synergistic blend of the invention also includes an amine-based component comprising a hydroxylated alkoxyamine. Such amines are disclosed in U.S. patent Ser. No. 11/612,702 titled "Functionalized Amine-Based Corrosion Inhibitors for Galvanized Metal Surfaces and Method of Using Same" (incorporated herein by reference in its entirety). Representative amine-based white rust-reducing compounds include substituted amines, such as mono-substituted monoamines, mono-substituted polyamines, poly-substituted monoamines, poly-substituted polyamines, mono-substituted polyether monoamines, mono-substituted polyether polyamines, poly-substituted polyether monoamines, poly-substituted polyether polyamines. These substituted amines include one or more hydroxyl groups. It is further contemplated that other amine-based compounds may be utilized in the method of the invention, such as imino derivatives, hydroxyamine derivatives, and combination thereof. Preferred compounds include diethyl triamine, diglyciol amine, alkoxy amine derivatives, and the like.

In a preferred embodiment, the compound is formed from a polyoxypropylene diamine. In another preferred embodiment, the compound is of the formula $[CH(OH)CH(OH)CH_2]_2N—[CH(CH_3)CH_2O]_X—N[CH_2CH(OH)CH(OH)]_2$. X is from 1 to about 20. In this embodiment, the amine groups of the compound are fully hydroxyl-functionalized.

In alternative embodiments, the hydroxylated alkoxyamine includes one or more of $[R]_2N—[R1]_X-N[R]_2$ and $[R]_2N—[CH_2CH_2—N(R2)-CH_2CH_2]_X—N[R]_2$. R includes mono-hydroxylated alkyl groups or poly-hydroxylated alkyl groups. R1 includes oxyethylene, polyether, or combinations thereof. R2 includes H, alkyl groups, alkylated carboxylates, alkylated sulfonates, mono-hydroxylated alkyl groups, or poly-hydroxylated alkyl groups. X is from 1 to about 20. In one embodiment the alkyl groups are branched or unbranched $C_1$ to $C_6$. Alkyl as used herein means a monovalent group derived from a straight or branched saturated chain hydrocarbon by the removal of a single hydrogen atom. Representative alkyl groups include methyl, ethyl, n- and iso-propyl, cetyl, and the like.

In another embodiment, the amine-based component is a reaction product of $H_2N—[R3]_Y-NH_2$ and chloropropanediol, glycidol, or epichlorohydrin. In this embodiment, R3 includes $[—CH_2CH_2—N(R4)-CH_2CH_2]$, oxypropylene, oxyethylene, polyether, or combinations thereof. R4 includes H, alkyl groups, alkylated carboxylates, alkylated sulfonates, mono-hydroxylated alkyl groups, or poly-hydroxylated alkyl groups. Y is from 1 to about 20. In one embodiment, the alkyl groups are branched or unbranched $C_1$ to $C_6$. In a further embodiment, an amine derivative is reacted with a dicarboxylic acid, such as oxalic acid or adipic acid, to form the amine-based component.

In a further embodiment, the amine-based component is an imino derivative or a hydroxyamine derivative reaction product of an aldehyde or a ketone with a monoamine or a polyamine. In another embodiment, the compound is an imino derivative or a hydroxyamine derivative reaction product of an aldehyde or a ketone with a polyether monoamine or a polyether polyamine. For example, reaction of glyoxylic acid with diglycolamine at elevated temperature (e.g., 40° C. to 80° C.) for a sufficient time to promote a dehydration reaction. Acid catalyst, such as sulfuric acid, may also be used.

An exemplary method of preparing the amine-based component is to react Jeffamine® D230 (a registered trademark of and available from Huntsman, Salt Lake City, Utah), which is characterized by repeating oxypropylene units in the backbone and has the chemical formula $H_2N—(CH(CH_3)CH_2O)_Z—CH_2CH(CH_3)NH_2$, with glycidol (2,3-epoxy-1-propanol). Jeffamine D230 is a difunctional, primary amine with an average molecular weight of about 230 grams per mole. Z is typically from about 1 to about 20 repeating units. Preferably, Z is from 1 to 3, and most preferably, Z is 2. The reaction takes place at room temperature or at a slightly elevated temperature. Reaction products of the above reaction include 1,4 (quad-); 1,3 (tri-); and 1,2 (di-) substituted diamines. In a preferred embodiment, the reaction product of the above reaction is primarily 1,4 quad-substituted hydroxylated polyalkoxyamine.

In one aspect, introducing the corrosion-reducing composition onto the galvanized surface includes incorporating the method into a hot dip manufacturing process. For example, the metal would first be dipped in melted zinc at 450° C. (temperature at which iron/steel and zinc share great affinity) where the metal would be protected with a zinc coating. The next step in the manufacturing process would be to dip the zinc-coated metal into the corrosion-reducing composition including the amine-based white rust corrosion-reducing compound.

In another aspect, such introduction includes spraying a solution of the composition directly onto the surface, including surfaces in industrial water systems. In one embodiment, the composition is mixed with a foaming agent to form a mixture and the mixture is subsequently sprayed onto the galvanized metal surface using any suitable spraying device. Foaming agents may include surfactants, such as alkoxylated alcohols, polyethylene glycol, or any other suitable surfactant. In alternative embodiments, the composition may be physically applied onto the surface by rolling using a paint roller or the like, brushing using a paintbrush or the like, swabbing using a mop or the like, or by using any other suitable method or technique.

In another aspect, the corrosion-reducing composition is reintroduced onto the surface one or more times after one or more time intervals to "overlay" the barrier or "re-passivate" the surface. Ongoing overlaying steps to renew the corrosion-inhibitory barrier and/or to re-passivate the galvanized surfaces are also contemplated. As determined on a case-by-case basis, the method may include a plurality of different corrosion-reducing compositions and overlaying the barrier may include introducing a different one or more of the corrosion-reducing compositions onto the galvanized metal surface(s).

In one embodiment, an effective amount of the corrosion-reducing composition is introduced into the water of a cooling water circulation system (sometimes referred to herein as "cooling tower") to form a barrier on (or passivate) any galvanized metal surfaces of the system. It should be appreciated that such introduction may be into a new, unused system prior to initial operation of the system or into a running, operational system. The corrosion-reducing composition of the invention may be introduced into any industrial water system as either an adjunct treatment in combination with other compositions or programs, such as scale and/or corrosion-reducing programs, or as a stand-alone treatment program, as described in more detail herein.

Although not required to implement this invention, it is contemplated that the corrosion-reducing composition may be combined with one or more other corrosion inhibitors, one or more scale inhibitors, one or more fluorescent tracers, one or more water treatment polymers, one or more polyalkoxy compounds, or any other suitable adjunct or additional component. Any such adjuncts may be part of an existing corrosion-inhibitive program to which the invention becomes an additional component or program. Adjuncts may be part of the corrosion-reducing composition or may be another separate composition or compositions. In alternative embodiments, such adjuncts may be added simultaneously or sequentially with the corrosion-reducing composition of the invention.

Exemplary other corrosion and scale inhibitors include tungstate; molybdate; vanadate; phosphate; phosphonate; phosphinate; silicate; borate; zinc and its salts; polycarboxylates; benzoic acid; the like; combinations thereof; or any other suitable corrosion or scale inhibitors. Exemplary water treatment polymers include polyacrylic acid; polymaleic acid; copolymers and terpolymers of acrylic acid, maleic acid, acrylamide, and acrylamidopropyl sulfonate; prism polymers; sulfonate-based polymers; and terpolymers or copolymers of acrylic acid, acrylamide, sulfomethylated acrylamide, the like, and combinations thereof.

Preferably, the synergistic blend includes from about 0 to 10 weight percent of the amine-based component and from about 10 to about 100 weight percent of the benzotriazole, with the balance being adjunct components and water. More preferably, the amine-based component is present from about 2 to 10 weight percent and the benzotriazole is present from about 20 to about 100 weight percent, with the balance being adjunct components and water. Preferred blends include about 10 weight percent of the amine-based component and about 90 weight percent of the benzotriazole. More preferably, the blend includes about 40 weight percent of the amine-based component and about 60 weight percent benzotriazole. Most preferably, the blend is comprised of about 60 weight percent of the amine-based component and about 40 weight percent benzotriazole.

The dosage range for applying the blend of the invention is from at least about 20 to 50 ppm to about 200 ppm or greater, based on actives. The preferred dosage is about 10 to about 200 ppm, which may be increased based upon makeup water or condenser water conditions or the presence of halogens in the system. A more preferred dosage range is from about 40 to about 150 ppm and a most preferred range is from about 80 to about 110 ppm. The blend may be added to the system using any suitable chemical injection pump.

Maximum efficiency for the synergistic blend of the invention requires that the system be maintained at a pH level about 9.0. Although efficiency is reduced at pH levels below about 8.5 or above about 9.5, the blend is still effective. The blend should be fed at a location where sufficient mixing will occur and where it will be uniformly distributed throughout the system, for example, prior to the suction side of the circulating water pump. The most preferred method of feeding is continuous, although intermittent feeding may be used in certain cases.

In one embodiment, the composition is mixed with a foaming agent to form a mixture and the mixture is subsequently sprayed onto the galvanized metal surface using any suitable spraying device. Foaming agents may include surfactants, such as alkoxylated alcohols, polyethylene glycol, or any other suitable surfactant. In alternative embodiments, the composition may be physically applied onto the surface by rolling using a paint roller or the like, brushing using a paintbrush or the like, swabbing using a mop or the like, or by using any other suitable method or technique.

According to at least one embodiment, the dosage levels of the synergistic blend of the invention may be measured by a manual operator or an electronic device having components such as a processor, memory device, digital storage medium, cathode ray tube, liquid crystal display, plasma display, touch screen, or other monitor, and/or other components may be used to execute all or parts of the described method. In certain instances, the controller may be operable for integration with one or more application-specific integrated circuits, programs, computer-executable instructions, or algorithms, one or more hard-wired devices, wireless devices, and/or one or more mechanical devices. Some or all of the controller system functions may be at a central location, such as a network server, for communication over a local area network, wide area network, wireless network, Internet connection, microwave link, infrared link, and the like. In addition, other components such as a signal conditioner or system monitor may be included to facilitate signal-processing algorithms. It is also contemplated that any needed sensors, couplers, connectors, or other equipment to measure, transmit, and or communicate data may be used to capture and transmit data.

It should be appreciated that the method, in certain embodiments, may be combined with other utilities known in the industry. Representative utilities include sensors for measuring the content of various additives in the system; dissolved or particulate contaminant sensors; other sensors based upon resistance, capacitance, spectroscopic absorbance or transmittance, colorimetric measurements, and fluorescence; and mathematical tools for analyzing sensor/controller results (e.g., multivariate analysis, chemometrics, on/off dosage control, PID dosage control, the like, and combinations thereof).

In another embodiment, an inert fluorescent tracer is included in the synergistic blend to provide a means of determining the dosage level. A known proportion of the fluorescent tracer is added either simultaneously or sequentially with the blend. Effective inert fluorescent tracers include those substances that are chemically non-reactive with other components in the system and that do not significantly degrade with time. Such tracers should also be completely (or essentially completely) soluble in the blend at all relevant levels of concentration and preferably the fluorescence intensity should be substantially proportional to its concentration and not significantly quenched or otherwise diminished by other components in the system. Furthermore, the inert fluorescent tracer should not be appreciably or significantly affected by any other chemistry in the system. The statement, "not appreciably or significantly affected," means that an inert fluorescent compound generally has no more than about a 10% change in its fluorescent signal, under conditions normally encountered in fuel ethanol.

Desired characteristics for an inert fluorescent tracer preferably include: fluorescence excitation/emission wavelengths that do not have significant overlap with light absorbing substances present in the water of the system, other additives, contaminants, etc.; high solubility; excellent chemical stability; suitable fluorescence properties at manageable wavelengths (e.g., other components in the system should not interfere with the fluorescence properties at those wavelengths) and excitation/emission wavelengths that are separate from other fluorescent components that may be present in the system to prevent interference; and avoiding negative impacts on the properties of the system.

Representative inert fluorescent tracers include fluorescein or fluorescein derivatives; rhodamine or rhodamine derivatives; naphthalene sulfonic acids (mono-, di-, tri-, etc.); pyrene sulfonic acids (mono-, di-, tri-, tetra-, etc.); stilbene derivatives containing sulfonic acids (including optical brighteners); biphenyl sulfonic acids; phenylalanine; tryptophan; tyrosine; vitamin B2 (riboflavin); vitamin B6 (pyridoxin); vitamin E ($\alpha$-tocopherols); ethoxyquin; caffeine; vanillin; naphthalene sulfonic acid formaldehyde condensation polymers; phenyl sulfonic acid formaldehyde condensates; lignin sulfonic acids; polycyclic aromatic hydrocarbons; aromatic (poly)cyclic hydrocarbons containing amine, phenol, sulfonic acid, carboxylic acid functionalities in any combination; (poly)heterocyclic aromatic hydrocarbons having N, O, or S; a polymer containing at least one of the following moieties: naphthalene sulfonic acids, pyrene sulfonic acids, biphenyl sulfonic acids, or stilbene sulfonic acids. Additional examples of such inert fluorescent tracers may be found in U.S. Pat. No. 6,966,213 B2, entitled "Rapid Method for Detecting Leaks of Hydraulic Fluids in Production Plants" and U.S. Pat. No. 7,169,236 B2, entitled "Method of Monitoring Membrane Cleaning Process." These inert fluorescent tracers are either commercially available under the tradename TRASAR® from Nalco® Company (Naperville, IL) or may be synthesized using techniques known to persons of ordinary skill in the art of organic chemistry.

The foregoing may be better understood by reference to the following examples, which are intended for illustrative purposes and are not intended to limit the scope of the invention.

EXAMPLE 1

The makeup water source for each condenser system was municipal water having the following characteristics on average: pH=8.3; conductivity=400 micromhos; M-alkalinity=70; calcium ($CaCO_3$)=110; zinc=0.1; magnesium ($CaCO_3$)=55; chloride ($CaCO_3$)=60; sulfate ($CaCO_3$)=90; iron=N/A; ortho $PO_4$=0.1.

Galvanized coupons and panels were installed in the basin and spray areas of the condensers in an ammonia refrigeration condenser system. Samples in the basin were fully immersed and the samples in the spray area were wetted or dried based on flow through the nozzle system of the condensers. After removing each set of samples and cleaning, the corrosion rate was determined as follows: (i) drying and weighing; (ii) calculating weight loss in MPY; (iii) alkaline cleaning; (iv) drying and weighing; and (v) calculating weight loss in MPY.

The composition of White Rust Reducer 1 was a mixture of 6.25 weight percent poly[oxy(methyl) 1,2, ethandiyl], alpha-(2-aminomethyl(ethyl)-omega-(2-amino-methyl ethoxy) (CAS #9046-10-0) functionalized with 1,2 propanediol, 3-chloro (CAS #96-24-2) and 56.25 weight percent tolyltriazole.

The control samples and the samples treated with White Rust Reducer 1 were exposed to normal operating conditions for 28 days with the system pH at 8.9. Results shown in Table 1 are for control samples and those in Table 2 are for the treated samples. Table 1 represents the white rust corrosion rate on the galvanized coupons and panels installed in the basin and spray areas of the condensers in an ammonia refrigeration condenser system. Table 2 summarizes the white rust corrosion rate obtained after treating the same condenser with 50 ppm of White Rust Reducer 1.

TABLE 1

|  | Sample | Postclean MPY | Average MPY |
|---|---|---|---|
| Spray area | Coupon | 0.83 | 0.80 |
|  | Coupon | 0.76 |  |
|  | Panel | 0.25 | 0.29 |
|  | Panel | 0.32 |  |
| Sump | Coupon | 2.94 | 2.76 |
|  | Coupon | 2.58 |  |
|  | Panel | 0.6 | 0.60 |
|  | Panel | 0.59 |  |

TABLE 2

|  | Sample | Postclean MPY | Inhibition | Average % |
|---|---|---|---|---|
| Spray area | Coupon | 0.35 | 56% | 57% |
|  | Coupon | 0.34 | 58% |  |
|  | Panel | 0.15 | 48% | 46% |
|  | Panel | 0.16 | 45% |  |
| Sump | Coupon | 0.36 | 87% | 87% |
|  | Coupon | 0.35 | 87% |  |
|  | Panel | 0.12 | 80% | 81% |
|  | Panel | 0.1 | 83% |  |

Samples in the basin were fully immersed and samples in the spray area were wetted or dried based on the flow through the nozzle system of the condensers. Further analysis of all samples revealed that coupons showed greater loss than corresponding panels, likely due to "edge effect." White rust formation was more prevalent at the edges. Coupons with 22.2 $cm^2$ total surface area were impacted more by white rust attack than the panels (having a 311.8 $cm^2$ total surface area).

EXAMPLE 2

The control samples and the samples treated with White Rust Inhibitor 1 were exposed to normal operating conditions for 30 days with the pH of the system at 8.0. Results shown in Table 3 are for control samples and Table 4 are treated samples.

TABLE 3

| Location | Sample | MPY | Average MPY |
|---|---|---|---|
| Spray Area | Coupon | 1.9 | 1.86 |
|  | Coupon | 1.81 |  |
|  | Panel | 1.23 | 1.09 |
|  | Panel | 0.94 |  |
| Sump | Coupon | 2.8 | 2.7 |
|  | Coupon | 2.6 |  |
|  | Panel | 0.92 | 0.88 |
|  | panel | 0.83 |  |

TABLE 4

| Location | Sample | MPY | Inhibition | Average % |
|---|---|---|---|---|
| Spray Area | Coupon | 0.84 | 54% | 52% |
|  | Coupon | 0.93 | 50% |  |
|  | Panel | 0.62 | 43% | 44% |
|  | Panel | 0.58 | 45% |  |
| Sump | Coupon | 1.32 | 50% | 50% |
|  | Coupon | 1.3 | 50% |  |
|  | Panel | 0.35 | 60% | 62% |
|  | Panel | 0.32 | 64% |  |

EXAMPLE 3

To demonstrate the synergism of the blend, electrochemical corrosion rates were determined by measuring polarization resistance. Cathodic and anodic slopes were determined by Tafel scan before the polarization run. The scans were run using a Gamary Potentiostat/Galvanostat set at 0.1 mV/sec. A three-electrode electrochemical cell was used where the working electrode was a galvanized disk. Two steel electrodes functioned as one reference and the other the counter electrode.

The test solution was a mix of corrosive water and candidate inhibitor to be evaluated. Corrosive water generally consisted of: Calcium 200 ppm (as $CaCO_3$); Magnesium 200 ppm (as $CaCO_3$); Chloride 500 ppm; and Bicarbonate 150 ppm. 190 ml of test solution was used in each test and was continuously stirred using a magnetic stirrer while maintained at 80+/−2° F. Measurements were made in 5 hour intervals until high corrosion rate damaged working electrode galvanized surface. The results are shown graphically in FIG. 1.

It should be understood that various changes and modifications to the presently preferred embodiments described herein will be apparent to those skilled in the art. Such changes and modifications can be made without departing from the spirit and scope of the invention and without diminishing its intended advantages. It is therefore intended that such changes and modifications be covered by the appended claims.

The claimed invention is:

1. A method of reducing corrosion on a galvanized metal surface, said method comprising: (a) introducing an effective amount of a composition onto the galvanized metal surface to form a barrier on said surface, the composition comprising a first compound that is poly[oxy(methyl)-1,2-ethandilyl], alpha-(2-aminomethylethyl)-omega-(2-aminomethyl-ethoxy)-) functionalized with 1,2-propanediol, 3-chloro, and a second compound that is tolyltriazole and (b) after one or more time intervals, optionally overlaying the barrier by reintroducing an effective amount of the composition onto the galvanized metal surface;
wherein the effective amount provides an actives concentration of 5 ppm of the first compound and 5 ppm of the second compound.

2. The method of claim 1, wherein the galvanized metal surface is part of an industrial water system.

3. The method of claim 1, including spraying or physically applying an effective amount of said composition directly onto the galvanized metal surface.

4. The method of claim 1, including dipping the galvanized metal surface into a solution containing said composition.

5. The method of claim 1, including mixing a foaming agent with the composition to form a mixture and spraying an effective amount of the mixture onto the galvanized metal surface to form the barrier.

6. The method of claim 1, including a plurality of different compositions and repeating step (b) after one or more of the time intervals by introducing a different one of the compositions onto the galvanized surface.

7. The method of claim 1, wherein the industrial water system includes a cooling water circulation system.

8. The method of claim 1, wherein said composition includes one or more compounds selected from the group consisting of: other corrosion inhibitors, scale inhibitors, fluorescent tracers, and water treatment polymers.

9. The method of claim 1, including adding one or more other corrosion or scale reducing compositions that include one or more corrosion or scale reducing compounds with or without one or more fluorescent tracer compounds either simultaneously or sequentially with said composition.

10. The method of claim 1, wherein the composition includes one or more other corrosion inhibitors selected from the group consisting of: phosphates; phosphonates; phosphinates; silicates; molybdate; tungstate; borate; zinc and its salts; vanadate; chromate; polycarboxylates; and combinations thereof.

11. The method of claim 1, including adding one or more water treatment polymers either simultaneously or sequentially with the composition, said polymer selected from the group consisting of: polyacrylic acid; polymaleic acid; copolymers and terpolymers of acrylic acid, maleic acid, acrylamide, and acrylamidopropyl sulfonate; prism polymers; sulfonate-based polymers; and terpolymers or copolymers of acrylic acid, acrylamide, and sulfomethylated acrylamide.

12. The method of claim 1, wherein the composition comprises 6.25 weight percent of the first compound and 56.25 weight percent of the second compound.

* * * * *